US008545593B2

(12) United States Patent
Hoffman

(10) Patent No.: US 8,545,593 B2
(45) Date of Patent: Oct. 1, 2013

(54) DIRECT PROCESSING OF METALLIC ORE CONCENTRATES INTO FERROALLOYS

(75) Inventor: Glenn E. Hoffman, Lancaster, SC (US)

(73) Assignee: Cardero Resource Corporation, Vancouver, B.C. (CA)

(*) Notice: Subject to any disclaimer, the term of this patent is extended or adjusted under 35 U.S.C. 154(b) by 21 days.

(21) Appl. No.: 13/317,619

(22) Filed: Oct. 24, 2011

(65) Prior Publication Data

US 2012/0036960 A1    Feb. 16, 2012

Related U.S. Application Data

(63) Continuation-in-part of application No. 12/452,850, filed on Jan. 23, 2010, now abandoned, and a continuation-in-part of application No. 12/452,849, filed on Jan. 23, 2010, now Pat. No. 8,043,408.

(51) Int. Cl.
*C21B 13/08*   (2006.01)
*C21C 5/54*    (2006.01)
*C22B 4/06*    (2006.01)
*B03B 5/00*    (2006.01)
*B03C 7/00*    (2006.01)

(52) U.S. Cl.
USPC ............. 75/10.63; 75/435; 75/475; 75/479; 75/481; 75/770; 75/958; 208/1; 208/155; 208/127.1

(58) Field of Classification Search
None
See application file for complete search history.

(56) References Cited

U.S. PATENT DOCUMENTS

| | | | |
|---|---|---|---|
| 5,431,710 A * | 7/1995 | Ebenfelt | 75/443 |
| 5,906,671 A * | 5/1999 | Weinwurm et al. | 75/479 |
| 6,582,491 B2 * | 6/2003 | Hoffman et al. | 75/10.63 |
| 8,158,054 B2 * | 4/2012 | Iwasaki et al. | 266/216 |
| 2005/0193864 A1 * | 9/2005 | Steeghs et al. | 75/772 |

* cited by examiner

*Primary Examiner* — Kaj K Olsen
*Assistant Examiner* — Jared Wood
(74) *Attorney, Agent, or Firm* — Ralph H. Dougherty

(57) ABSTRACT

A method for producing liquid ferroalloy by direct processing of manganese and chromium bearing iron compounds, by the steps: of mixing carbonaceous reductant, fluxing agent, and a binder with materials such as iron sands, metallic oxides, manganese-iron ore concentrates and/or chromium-iron ore concentrates and silica sands, to form a mixture; forming agglomerates from the mixture; feeding the agglomerates to a melting furnace with other materials; melting the feed materials at a temperature of from 1500 to 1760° C. and forming a slag and hot metal; removing the slag; tapping the hot metal as liquid ferroalloy, and utilizing the off-gases from the melting furnace as combustion fuel to drive a turbine and to generate electricity.

16 Claims, 3 Drawing Sheets

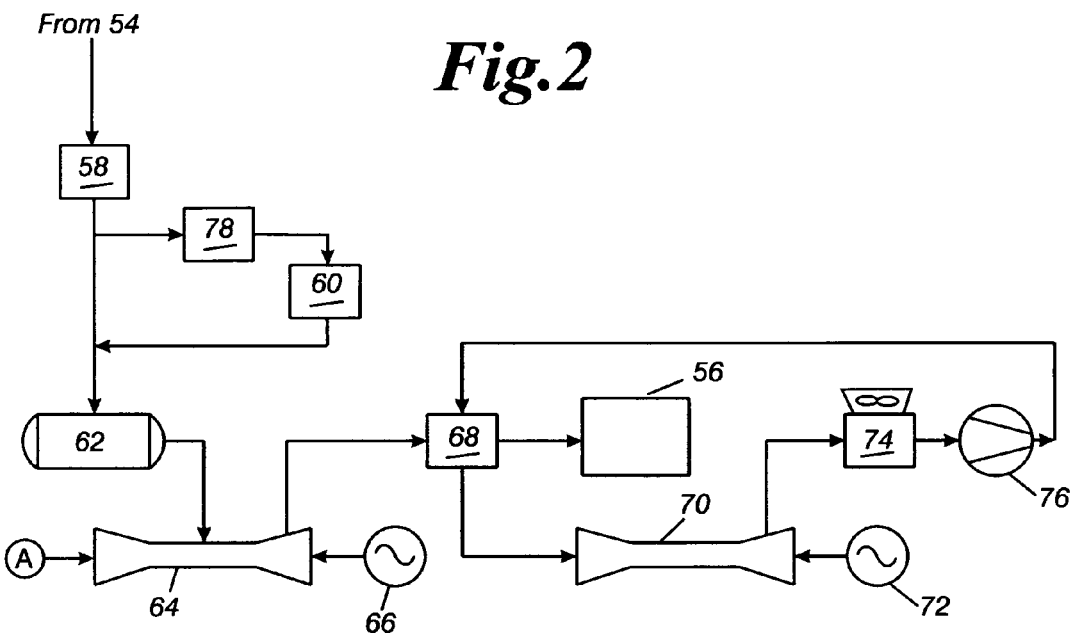
*Fig.2*
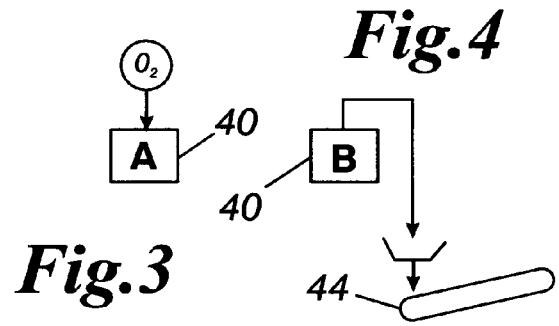
*Fig.4*
*Fig.3*

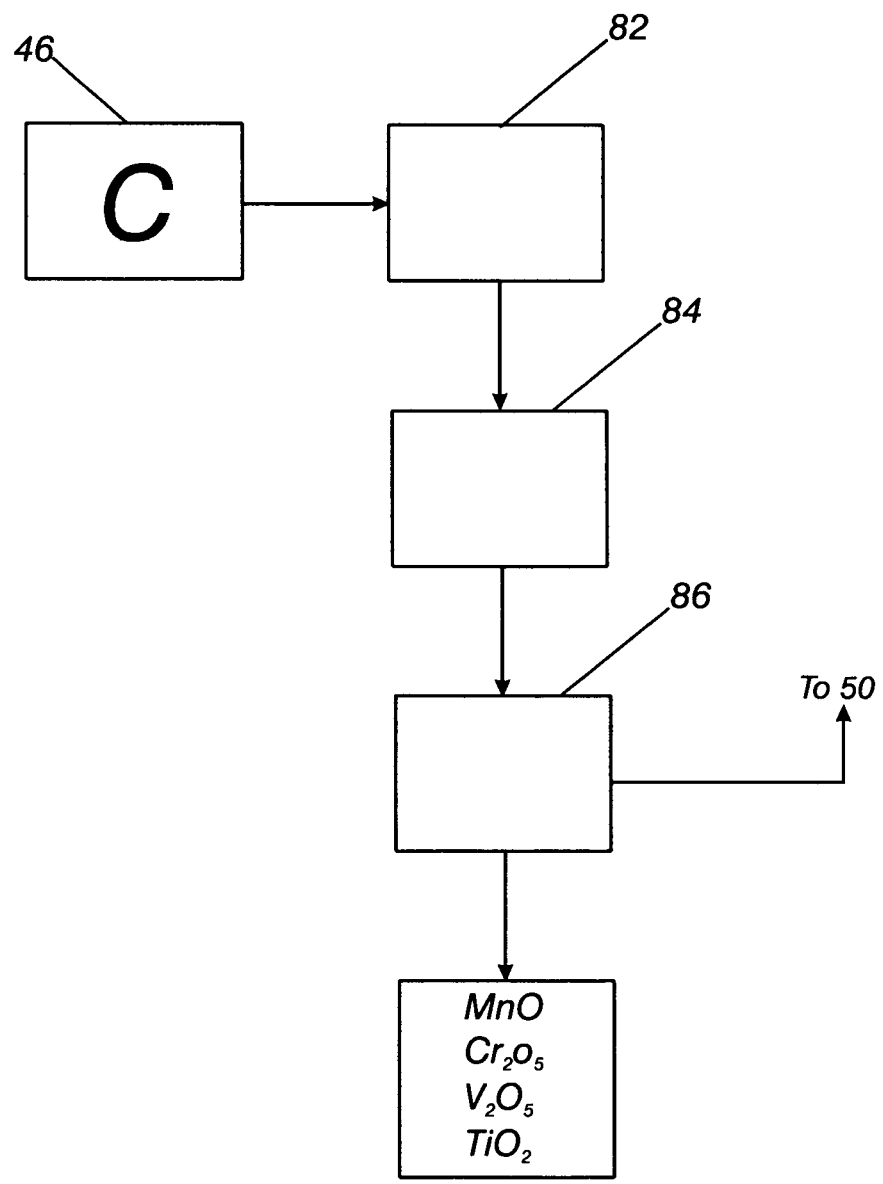

DIRECT PROCESSING OF METALLIC ORE CONCENTRATES INTO FERROALLOYS

CROSS REFERENCE TO RELATED APPLICATIONS

This application is a continuation-in-part application of U.S. patent application Ser. No. 12/452,850, filed Jan. 23, 2010, now U.S. Pat. No. 8,043,408, of U.S. patent application Ser. No. 12/452,849, filed Jan. 23, 2010; of PCT Application PCT/US2008/010122, filed 12 Aug. 2008: of PCT Application PCT\US2008\010123, filed 12 Aug. 2008; U.S. Provisional Application Ser. No. 60/967,347, filed 4 Sep. 2007; U.S. Provisional Patent Application Ser. No. 60/997,616, filed: 4 Oct. 2007; and U.S. Provisional Patent Application Ser. No. 61/126,915, filed 8 May 2008. This application claims the benefit of priority of the foregoing applications.

FIELD OF THE INVENTION

The present invention relates to a method and apparatus for direct processing of manganese, chromite and silica bearing compounds (Mn—Fe and Cr—Fe ores, and silica) to produce a liquid ferroalloy and iron, employing the concept of combined cycle power generation using a gas combustion turbine.

SUMMARY OF THE INVENTION

Mn—Fe ores, Cr—Fe ores, and silica are cold briquetted to form compact agglomerates containing a carbonaceous material such as coal, petcoke, char, etc., iron oxide (either already contained in the ore or added separately as iron ore fines, mill scale, metallized iron fines, etc., to the mix), fluxes such as lime, silica, spar, etc., and binder. An excess amount of carbon is present in the agglomerate not only to react with the manganese, chromium, and silica compounds, but also to reduce the iron oxide, manganese oxide, etc., so that the atmosphere within the melter is predominantly CO with some liberated $H_2$ from the volatilization of the carbonaceous material such as coal. Sulfur in the system is free to combine with the flux additions (CaO, $CaF_2$, MgO, etc.), to form a sulfur-containing liquid slag.

OBJECTS OF THE INVENTION

The principal object of the present invention is to provide a method of producing silicamanganese, ferromanganese or ferrosilicon ferroalloy from ordinary ore materials.

Another object of the invention is to provide a method for producing the required electricity to accommodate the process and operate the plant in such manner as to be substantially electricity self sufficient.

Another object of the invention is to provide a method of recovering manganese, chromium, vanadium, and titanium as oxides from ores.

BRIEF DESCRIPTION OF THE DRAWINGS

The foregoing and other objects will become more readily apparent by referring to the following detailed description and the appended drawings in which:

FIG. 2 is a schematic flowsheet for handling of off-gases.

FIG. 3 is a schematic flowsheet for treating hot metal to form vanadium and titanium oxides.

FIG. 4 is a schematic depiction of recovering hot metal in pig form.

FIG. 5 is a schematic depiction of slag treatment to recover vanadium and titanium oxides or to recover concentrated slag for recycle.

Figure 1:
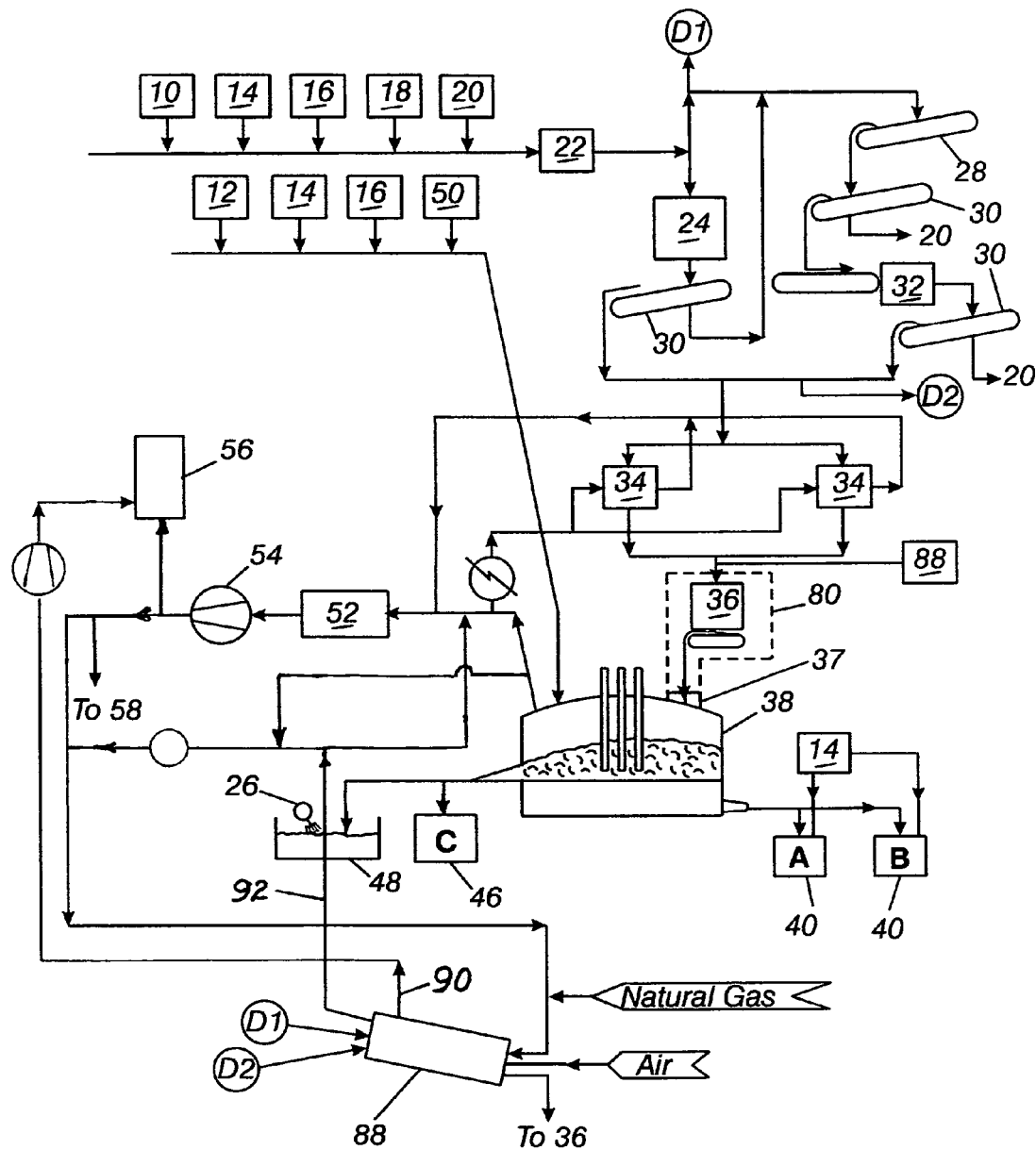
FIG. 1 is a schematic flowsheet of the process, wherein the reference numerals refer to the items as indicated below.

In the figures, reference numerals refer to:
- 10—Mn—Fe, Cr—Fe, $SiO2$, or concentrates—100% passing 10 mesh Tyler Standard (1.70 mm), preferably 100% passing 100 mesh Tyler Standard (150 microns)
- 12—metallic iron fines, and iron oxide fines—100% minus 25 mm, preferably 100% passing 10 mesh
- 14—prepared reductant, such as coal, petroleum coke, char, etc., 100% passing 25 mm, preferably 100% passing 100 mesh Tyler Standard (150 microns)
- 16—fluxing agents—CaO, MgO, $CaF_2$, $SiO_2$, $Al_2O_3$, etc—100% minus 25 mm
- 18—binder such as cellulose, bentonite, molasses, starch—either organic or inorganic
- 20—recycled fines
- 22—mixer
- 24—briquetter/agglomerator (size 8 to 100 cc)
- 26—water addition (spray)
- 28—pelletizer—drum or disc type
- 30—screens—dry or roller type
- 32—greenball dryer (dries pellets to 1% moisture or less)
- 34—agglomerate (briquette) curing/storage hoppers, or preheaters
- 36—feed loss in weight system
- 37—pressure seal
- 38—electric melter or melting furnace, operating temperature>1500° C.
- 40—ladles A and B for liquid ferroalloy
- 42—slag addition for desulfurization
- 44—pig iron caster
- 46—slag ladle C
- 48—slag disposal/quench bunker
- 50—recycle slag
- 52—off-gas cooling scrubber/bag filter
- 54—fan
- 56—stack with combustion to convert CO & $H_2$ to $CO_2$ & $H_2O$
- 58—high pressure compressor (100-350 psig)
- 60—optional gas stream, sulfur removal system, such as Selexol
- 62—high pressure gas accumulator tank
- 64—gas turbine (exit gas temp 600-700° C.)
- 66—generator
- 68—waste heat boiler exchanger
- 70—high pressure steam turbine
- 72—generator
- 74—boiler closed circuit water conduit
- 76—pump
- 78—optional chiller upstream of gas sulfur removal system
- 80—pressure sealed chamber
- 82—quench
- 84—grinding
- 86—drying and electrostatic separation
- 88—heater, direct or indirect rotary kiln type
- 90—combustion exhaust gases
- 92—agglomerate off-gases
- 94—cyclone

DETAILED DESCRIPTION

As seen in FIG. 1, which is a schematic diagram of the invented method for producing a liquid ferroalloy is in which the feed materials are preheated with or without agglomeration, and then fed to the melting furnace, various feed materials are introduced to mixer 22, the input materials consisting of: iron sands, metallic oxides, manganese-iron ore concentrates and/or chromium-iron ore concentrates, and silica sands 10, 100% passing 10 mesh Tyler Standard (1.70 mm), preferably 100% passing 100 mesh Tyler Standard (150 microns); prepared carbonaceous reductant 14, such as coal, coke, petroleum coke, char, or other carbonaceous material, 100% passing 25 mm, preferably 100% passing 100 mesh Tyler Standard (150 microns); slag formers or fluxing agents 16, such as MgO, CaO, $Al_2O_3$, $CaF_2$ (fluorspar) and $SiO_2$, 100% of which are minus 25 mm; an organic or inorganic binder 18, such as cellulose, bentonite, molasses, starch, or mixtures thereof; recycled fines 20, and water 26 as needed.

The feed materials are mixed in mixer 22, then formed into agglomerates in briquetter/agglomerator 24, or in pelletizer 28 (such as a drum or disc type pelletizer), the agglomerates being in the form of uniformly sized briquettes or pellets. The agglomerates are screened by sizer 30, the undersized material being returned to the agglomerator 24 or to the pelletizer 28.

At least a portion of the material D1 exiting mixer 22 is introduced to a heater 88 for the purposes of preheating the mixture to about 500 to 1200 C, devolatizing the reductant, and producing a preheated charge to electric furnace melter 38. Pre-reduction of the iron oxide will occur to levels ranging from about 0 to 90%. Agglomerated material D2 can also be preheated in a heater 88, if desired, prior to feeding the material to the melter 38 through pressure seal 37. The heater 88 can be an indirectly heated rotary kiln, or a direct fired kiln, with off-gases being treated and recycled, as shown in FIG. 1. The heater 88 can be refractory lined, or it can be unlined, as desired. Gases 92 evolved from the heating of agglomerates in heater 88 are rich in carbon monoxide and hydrogen. This off-gas can be mixed with hot off-gas from melter 38, any entrained particulate matter removed in cyclone 94, and then utilized as hot fuel gas for heater 88. Alternatively both hot off-gas from melter 38 and agglomerate off-gas 92 from heater 88 can be cleaned and cooled in scrubber 52 and compressed at 54 to produce a clean, cool fuel gas for turbine 64, or as fuel for heater 88, or directed to stack 56.

Screened pellets from pelletizer 28 are dried in a greenball dryer 32 to 1% or less moisture content. The agglomerates are cured and/or stored in hoppers 34, then fed into an electric melter, or melting furnace 38 through a pressure-sealed feed system 36. Feed to the melter is through a pressure-sealed chamber 80, a conventional feed leg with pressure seal 37 as is used with a shaft furnace, or through lock valves. The melter off-gas is treated, cooled and scrubbed in cooler-scrubber 52, compressed in compressor 54 and delivered to stack 56 which includes combustion means for converting carbon monoxide and hydrogen to carbon dioxide and water vapor. The melter 38 operates at neutral to slightly positive pressure, preferably operating under a slightly positive pressure. The slag and the hot metal are tapped from the melter on an intermittent basis.

Optionally one or more additional feed materials may be introduced through a pressure seal directly to the melter 38, including metallic iron fines and iron oxide fines 12, 100% of which are minus 25 mm; prepared reductant 14, such as coal, coke, petroleum coke, char, or other carbonaceous material, 100% passing 25 mm, preferably 50% passing 10 mesh; slag formers or fluxing agents 16, such as MgO, CaO, $Al_2O_3$, $CaF_2$ (fluorspar) and $SiO_2$, 100% of which are minus 25 mm; and recycled slag 50. The feed materials are melted in the melting furnace 38 at a temperature of from 1500 to 1760 C to form a liquid ferroalloy with a slag thereon;

Liquid ferroalloy is removed from the melter by tapping it into ladles 40 and may be cast into ferroalloy pigs at pig caster 44, as shown. Additional fluxing agents 16, such as CaO, MgO, $CaF_2$, $SiO_2$, or $Al_2O_3$, may be added to the hot liquid ferroalloy as it is discharged into ladles 40 (A and B). A desulfurizing slag addition 42 is introduced into a hot metal ladle shown as B, the addition being CaO, MgO, Ca/Mg wire, or a mixture thereof. The hot metal from either ladle A or B can be cast into pigs.

The slag from ladle C may contain unreduced oxidized species of Mn and Cr, or if vanadium and titanium values are present in the ores or concentrates 10, the slag may contain unreduced oxidized species of Mn, Cr, V and Ti due to partitioning effects between the liquid ferroalloy and slag. The slag can then be treated as shown in FIG. 5 by quenching 82 to solidify the slag, grinding 84 of the solid slag, and drying and electrostatic separation 86 to recover any of MnO, $Cr_2O_5$, $V_2O_5$ and $TiO_2$. After removal of MnO, $Cr_2O_5$, $V_2O_5$ and $TiO_2$, concentrated slag 50 may then be recycled to the melter 38, if desired, in order to increase the desired material concentration of slag, and improve the efficiency of recovery.

Alternatively, the ground slag can be subjected to gravity separation, which may be a wet separation process, or to a wet high-intensity separation, to selectively recover any or all of MnO, $Cr_2O_5$, $V_2O_5$ or $TiO_2$.

Recovery of oxidized species, MnO, $Cr_2O_5$, $V_2O_5$ and $TiO_2$, from the concentrated slag can also be obtained by solvent extraction, in which the compounds are separated based on their relative solubilities in two different immiscible liquids, preferably water and an organic solvent.

The operating parameters of the invented process are as follows:

| | Normal Range | Maximum |
| --- | --- | --- |
| Ferroalloy Melter Temp. | 1500-1600° C. | 1700-1760° C. |
| Melter Off-Gas | 500-1500° C. | 1200-1650° C. |
| Melter Off-Gas Pressure | 0-0.2" $H_2O$ gauge | <15" $H_2O$ gauge |
| Gas Accumulator Off-Gas Pressure | 100-350 psig | |
| Gas Turbine Combined Product Exit Temp. | 750-900° C. | <1000° C. |

Off-gas formed in the melting furnace 38 is removed and cleaned in cooler-scrubber 52. Cleaned off-gas from the cooler-scrubber 52 may be moved by fan 54 through high pressure compressor 58, as shown in FIG. 2, in which the gas is compressed. The compressor operates in the range of about 100 to 350 psig, and the cleaned, compressed off-gas is used as combustion fuel to drive gas turbine 64, or used for preheating agglomerates in hopper/preheaters 34 prior to their introduction to the electric melting furnace 38, or both. Gas turbine 64 drives generator 66 to produce electricity, and sensible heat contained in off-gas exiting the gas turbine is recovered in a waste heat recovery boiler system 68. The steam cycle of waste heat boiler system 68 could be a "Kalina" cycle based on using 70% ammonia and 30% water for better range processing and heat recovery efficiency at lower gas temperatures. Ammonia/water boiling occurs over a range of temperatures rather that at a specific temperature and pressure. Steam produced by the waste heat boiler system 68 is then used to drive a steam turbine 70 and associated generator 72 to produce additional electricity. A secondary objective of the invention is to supplement or produce all the required electricity to accommodate the process and operate the plant so as to be electricity self sufficient. If sufficient fuel gas is not produced by the melter, then additional fuel gas, such as natural gas, can be used to supplement the fuel gas feed to the gas turbine.

Gas from the compressor 54 can be treated for sulfur removal in an optional sulfur removal system 60, which may require an optional chiller 78 upstream of the sulfur gas removal system.

The agglomerate curing or storage hoppers 34 can be preheaters, such as a shaft or vessel preheater, as desired. When used as preheaters, off-gas from the electric furnace or melter 38 can be utilized as shown in FIG. 1. The off-gas is returned to the gas handling system at cooler-scrubber 52.

SUMMARY OF THE ACHIEVEMENT OF THE OBJECTS OF THE INVENTION

From the foregoing, it is readily apparent that I have invented an improved method of producing liquid ferroalloy (ferrosilicon, ferromanganese, and silicamanganese) from ordinary ore materials, as well as a method of recovering metallic oxides contained in the slag, such as manganese oxide, chromium oxide, vanadium oxide and titanium oxide, and a method for producing the required electricity to accommodate the process and operate the plant in such manner as to be substantially electricity self sufficient.

It is to be understood that the foregoing description and specific embodiments are merely illustrative of the best mode of the invention and the principles thereof, and that various modifications and additions may be made to the apparatus by those skilled in the art, without departing from the spirit and scope of this invention, which is therefore understood to be limited only by the scope of the appended claims.

What is claimed is:

1. A method for producing liquid ferroalloy by direct processing of manganese and chromium bearing compounds, comprising the steps of:
   (a) mixing:
      i. materials selected from the group consisting of iron sands, metallic oxides, manganese-iron ore concentrates and/or chromium-iron ore concentrates and silica sands, at least one of which contains either manganese or chromium;
      ii. carbonaceous reductant;
      iii. fluxing agent; and
      iv. a binder to form a mixture;
   (b) forming agglomerates from said mixture;
   (c) preheating at least a portion of said agglomerates in a rotary kiln heater to a temperature of 500 to 1200 C.;
   (d) introducing said preheated agglomerates to a melting furnace;
   (e) maintaining an operating pressure within the melting furnace from neutral to slightly positive;
   (f) maintaining a reducing atmosphere within the melting furnace;
   (g) melting the feed materials at a temperature of from 1500 to 1760 C and forming a slag thereon containing oxides of manganese and chromium;
   (h) removing the slag;
   (i) quenching the molten slag to solidify the slag;
   (j) grinding the solid slag;
   (k) separation of MnO and $Cr_2O_5$ from the slag;
   (l) recovery of MnO and $Cr_2O_5$;
   (m) tapping the hot metal as hot liquid ferroalloy;
   (n) forming off-gases in the melting furnace, cleaning and cooling the off-gases, and utilizing the cleaned off-gases as combustion fuel to drive a turbine and to generate electricity; and
   (o) producing off-gases in the turbine, recovering the off-gases from the turbine and recovering the sensible heat contained therein as steam in a waste heat recovery boiler system.

2. A process according to claim 1, wherein:
   100% of the iron sands, metallic oxides, manganese-iron ore concentrates and/or chromium-iron ore concentrates and silica sands pass 10 mesh Tyler Standard (1.70 mm);
   100% of the carbonaceous reductant is minus 25 mm; and
   100% of the fluxing agent is minus 25 mm.

3. A process according to claim 2, wherein 100% of the iron sands, metallic oxides, manganese-iron ore concentrates and/or chromium-iron ore concentrates and silica sands pass 100 mesh Tyler Standard.

4. A process according to claim 1, wherein the carbonaceous reductant is selected from the group consisting of coal, coke, petroleum coke, and char.

5. A process according to claim 1, wherein the fluxing agent is selected from the group consisting of CaO, MgO, $CaF_2$, $SiO_2$, $Al_2O_3$, and mixtures thereof.

6. A process according to claim 1, wherein the binder is selected from the group consisting of cellulose, bentonite, molasses, starch or mixtures thereof.

7. A process according to claim 1, wherein the rotary kiln heater is indirectly heated.

8. A process according to claim 1, further comprising forming off-gases in the rotary kiln heater, and mixing them with off-gases from the melting furnace to form said combustion fuel to drive a turbine and to generate electricity.

9. A process according to claim 1, further comprising forming off-gases in the rotary kiln heater, and mixing them with off-gases from the melting furnace to form a mixed gas, removing particulate matter from the mixed gas, to form hot fuel for the rotary kiln heater.

10. A process according to claim 1, further comprising utilizing the steam to drive a steam turbine and an associated generator to produce additional electricity, thereby accommodating substantially all the electrical requirements of the process.

11. A process according to claim 1, wherein the separation is carried out electrostatically or by solvent extraction, or by gravity separation, or by wet separation, or by wet high-intensity separation.

12. A process according to claim 1, wherein the manganese and chromium bearing compounds also contain vanadium and titanium, and wherein the slag contains oxides of manganese, chromium, vanadium and titanium, the process further comprising, following grinding of the solid slag:
   separation of MnO, $Cr_2O_5$, $V_2O_5$ and $TiO_2$, and
   recovery of MnO, $Cr_2O_5$, $V_2O_5$ and $TiO_2$.

13. A process according to claim 12, wherein the separation is carried out electrostatically or by solvent extraction, or by gravity separation, or by wet separation, or by wet high-intensity separation.

14. A process according to claim 1, further comprising introducing one or more additional feed materials directly to the melter, such additional feed materials comprising:
   metallic iron fines and iron oxide fines;
   carbonaceous reductant;
   slag formers or fluxing agents; and
   recycled slag.

15. A process according to claim 1, further comprising adding fluxing agents to the hot liquid ferroalloy during tapping.

16. A method for producing liquid ferroalloy by direct processing of manganese and chromium bearing compounds, comprising the steps of:
(a) mixing:
  i. materials selected from the group consisting of iron sands, metallic oxides, manganese-iron ore concentrates and/or chromium-iron ore concentrates and silica sands, at least one of which contains either manganese or chromium;
  ii. carbonaceous reductant;
  iii. fluxing agent; and
  iv. a binder to form a mixture;
(b) forming agglomerates from said mixture;
(c) preheating at least a portion of said agglomerates in a rotary kiln heater to a temperature of 500 to 1200° C.;
(d) introducing said preheated agglomerates to a melting furnace;
(e) maintaining a positive operating pressure within the melting furnace;
(f) maintaining a reducing atmosphere within the melting furnace;
(g) melting the feed materials at a temperature of from 1500 to 1760° C. and forming a slag thereon containing oxides of manganese and chromium;
(h) removing the slag;
(i) quenching the molten slag to solidify the slag;
(j) grinding the solid slag;
(k) separation of MnO and $Cr_2O_5$ from the slag;
(l) recovery of MnO and $Cr_2O_5$;
(m) tapping the hot metal as hot liquid ferroalloy;
(n) forming off-gases in the melting furnace, cleaning and cooling the off-gases, and utilizing the cleaned off-gases as combustion fuel to drive a turbine and to generate electricity; and
(o) producing off-gases in the turbine, recovering the off-gases from the turbine and recovering the sensible heat contained therein as steam in a waste heat recovery boiler system.

* * * * *